US012798580B2

(12) United States Patent
Kang

(10) Patent No.: US 12,798,580 B2
(45) Date of Patent: Nov. 17, 2026

(54) AUTONOMOUS DRIVING CONTROL APPARATUS AND METHOD THEREOF

(71) Applicants: HYUNDAI MOTOR COMPANY, Seoul (KR); Kia Corporation, Seoul (KR)

(72) Inventor: Dong Hoon Kang, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 598 days.

(21) Appl. No.: 17/983,852

(22) Filed: Nov. 9, 2022

(65) Prior Publication Data

US 2023/0286504 A1 Sep. 14, 2023

(30) Foreign Application Priority Data

Mar. 11, 2022 (KR) ........................ 10-2022-0030977

(51) Int. Cl.
*B60W 30/165* (2020.01)
*B60W 30/18* (2012.01)
*B60W 60/00* (2020.01)

(52) U.S. Cl.
CPC .... *B60W 30/165* (2013.01); *B60W 30/18163* (2013.01); *B60W 60/001* (2020.02); *B60W 2554/4046* (2020.02); *B60W 2554/80* (2020.02)

(58) Field of Classification Search
CPC ............. B60W 30/165; B60W 60/001; B60W 30/18163; B60W 2554/80; B60W 2554/4046
USPC ........................................................... 701/96
See application file for complete search history.

(56) References Cited

U.S. PATENT DOCUMENTS

2018/0281793 A1* 10/2018 Terayama ......... B60W 30/0956
2019/0337513 A1* 11/2019 Kim ...................... B60W 30/12
2020/0283025 A1* 9/2020 Honda .............. B60W 60/0025
2025/0162589 A1* 5/2025 Nardelli .......... B60W 30/18163

FOREIGN PATENT DOCUMENTS

KR 20170085750 A * 7/2017 ............ B60W 30/12

OTHER PUBLICATIONS

Lee; Machine translation of KR-20170085750-A; Jul. 2017; espacenet.com (Year: 2017).*

* cited by examiner

*Primary Examiner* — David P. Merlino
(74) *Attorney, Agent, or Firm* — Morgan, Lewis & Bockius LLP

(57) ABSTRACT

A lateral autonomous driving control apparatus following a target vehicle and a method thereof are provided. A sensor device provided in a vehicle detects pieces of information related to one or more surrounding other vehicles. A controller is configured to analyze lateral behaviors of the one or more surrounding other vehicles and determines whether the one or more surrounding other vehicles are vehicles suitable for lateral following autonomous driving control of the vehicle. The autonomous driving control apparatus actively select a target vehicle optimized for autonomous driving lateral control performance to improve completeness of an autonomous driving function.

6 Claims, 7 Drawing Sheets

| AUTOMATION LEVEL | SAE CLASSIFICATION CRITERIA | SYSTEM ROLE | DRIVER ROLE |
|---|---|---|---|
| LEVEL 0 | NO AUTOMATION | PERFORM TEMPORARY EMERGENCY INTERVENTION OR PROVIDE WARNING ONLY | DRIVER PERFORMS ALL DRIVING |
| LEVEL 1 | DRIVER ASSISTANCE | PERFORM SOME TRAVEL FUNCTIONS SUCH AS STEERING, ACCELERATION/DECELERATION, AND LIKE TOGETHER UNDER BOARDING OF DRIVER WHO PERFORMS TRAVEL FUNCTION IN NORMAL OPERATION SECTION | DRIVER DETERMINES WHETHER/WHEN TO OPERATE LEVEL 1 SYSTEM AND PERFORMS ALL DRIVING EXCEPT STEERING WHEEL OR ACCELERATION/DECELERATION PEDAL CONTROL (INCLUDING TRAVEL ENVIRONMENT/VEHICLE DRIVING/ LEVEL 1 SYSTEM MONITORING AND IMMEDIATE EMERGENCY PREPARATION) |
| LEVEL 2 | PARTIAL AUTOMATION | PERFORM TRAVEL FUNCTION SUCH AS STEERING, ACCELERATION/DECELERATION, AND LIKE INSTEAD OF DRIVER WHO IS MONITORING STEERING AND ACCELERATION/DECELERATION DEVICES UNDER BOARDING OF DRIVER | DRIVER DETERMINES WHETHER/WHEN TO OPERATE SYSTEM AND PERFORMS ALL DRIVING EXCEPT STEERING WHEEL OR ACCELERATION/DECELERATION PEDAL CONTROL (INCLUDING TRAVEL ENVIRONMENT/VEHICLE DRIVING/ LEVEL 2 SYSTEM MONITORING AND IMMEDIATE EMERGENCY PREPARATION) |
| LEVEL 3 | CONDITIONAL AUTOMATION | TRANSFER RIGHT TO CONTROL TRAVEL TO DRIVER IN SITUATION OUTSIDE CONDITION AND PERFORM TRAVEL FUNCTION SUCH AS STEERING, ACCELERATION/DECELERATION, AND LIKE | DRIVER DETERMINES WHETHER/WHEN TO OPERATE SYSTEM AND PERFORMS ALL DRIVING EXCEPT STEERING WHEEL OR ACCELERATION/DECELERATION PEDAL CONTROL AND TRAVEL ENVIRONMENT MONITORING (DRIVER IS ABLE TO PREPARE EMERGENCY BY NECESSARILY RECEIVING RIGHT TO CONTROL WHEN LEVEL 3 SYSTEM REQUESTS CONTROL TO RIGHT TRANSFER) |
| LEVEL 4 | HIGH AUTOMATION | SYSTEM PERFORMS ALL TRAVEL FUNCTIONS UNDER BOARDING OF DRIVER FOR EXTREMELY EXCEPTIONAL SITUATION | DRIVER MAY SELECTIVELY PREPARE EMERGENCY WHEN LEVEL 4 SYSTEM REQUESTS RIGHT TO CONTROL TRANSFER |
| LEVEL 5 | FULL AUTOMATION | PERFORM COMPLETE TRAVEL FUNCTION CAPABLE OF RESPONDING TO ALL SITUATIONS WITHOUT DRIVER | DRIVER ONLY DETERMINES WHETHER TO OPERATE SYSTEM BUT DOESN'T PERFORM ALL DRIVING |

Fig.1

AUTONOMOUS DRIVING CONTROL APPARATUS AND METHOD THEREOF

CROSS-REFERENCE TO RELATED APPLICATION

The present application claims priority to Korean Patent Application No. 10-2022-0030977, filed on Mar. 11, 2022, the entire contents of which is incorporated herein for all purposes by the present reference

BACKGROUND OF THE PRESENT DISCLOSURE

Field of the Present Disclosure

The present disclosure relates to an autonomous driving control apparatus and a method thereof, and more particularly, relates to a lateral autonomous driving control apparatus for following a target vehicle and a method thereof.

Description of Related Art

An autonomous vehicle needs a capability of adaptively coping with a surrounding situation which changes in real time while driving. First of all, a reliable determination control function is required to mass produce and enable autonomous vehicles. A semi-autonomous vehicle recently on the market basically performs driving, braking, and steering on behalf of a driver to reduce fatigue of the driver. Unlike fully autonomous driving, semi-autonomous driving should allow the driver to keep focusing on the driving, for example, should allow the driver to continue holding the steering wheel. Recently, the semi-autonomous vehicle is loaded with a highway driving assist (HDA) function, a driver status warning (DSW) function of determining driver carelessness, such as drowsy driving or gaze departure, and state abnormality and outputting a warning alarm through a cluster or the like, a driver awareness warning (DAW) function of determining whether the vehicle crosses the line and performs unstable driving by a front view camera, a forward collision-avoidance assist (FCA) or active emergency brake system (AEBS) function of performing emergency braking when detecting a head on collision, or the like to be sold.

When there is a preceding vehicle on an ego-lane, an existing autonomous driving system sets the preceding vehicle to a target to perform autonomous driving following the preceding vehicle. When there is no preceding vehicle, the existing autonomous driving system performs autonomous driving control based on the road speed limit. In the instant case, when the preceding vehicle is not a vehicle optimized for lateral autonomous driving control and when autonomous driving following the preceding vehicle is performed, an autonomous driving function may be released or autonomous driving performance may be degraded, as autonomous driving control violates the concept of the autonomous driving control. Thus, there is a need to develop a technology for addressing such problems.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a lateral autonomous driving control apparatus for following a target vehicle and a method thereof.

Another aspect of the present disclosure provides an autonomous driving control apparatus for addressing a problem of an existing technology, in which inappropriate another vehicle is set to a following target for lateral autonomous driving control and a method thereof.

Another aspect of the present disclosure provides an autonomous driving control apparatus for actively selecting a target vehicle optimized for lateral autonomous driving control performance to improve completeness of an autonomous driving function and a method thereof.

Another aspect of the present disclosure provides an autonomous driving control apparatus for preventing an autonomous driving function from being released as lateral autonomous driving control following a target vehicle in an autonomous driving system violates the concept of autonomous driving control to improve stability of the autonomous driving system and a method thereof.

Another aspect of the present disclosure provides an autonomous driving control apparatus for improving ride quality of an autonomous vehicle and a method thereof.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, an autonomous driving control apparatus may include a sensor device provided in a vehicle to detect pieces of information related to one or more surrounding other vehicles and a controller that analyzes lateral behaviors of the one or more surrounding other vehicles and determines whether the one or more surrounding other vehicles are vehicles suitable for lateral following autonomous driving control of the vehicle.

In an exemplary embodiment of the present disclosure, the sensor device may include at least one of a camera, a radio detecting and ranging (radar), or a light detection and ranging (LiDAR).

In an exemplary embodiment of the present disclosure, the controller may be configured to determine whether the one or more surrounding other vehicles are the vehicles suitable for the lateral following autonomous driving control of the vehicle, based on a similarity between a lateral behavior of the vehicle according to an autonomous driving control strategy of the vehicle and the lateral behaviors of the one or more surrounding other vehicles.

In an exemplary embodiment of the present disclosure, the controller may be configured to determine whether the one or more surrounding other vehicles are the vehicles suitable for the lateral following autonomous driving control of the vehicle, based on lane following performance of each of the one or more surrounding other vehicles.

In an exemplary embodiment of the present disclosure, the controller may be configured to determine whether the one or more surrounding other vehicles are the vehicles suitable for the lateral following autonomous driving control of the vehicle, based on a distance from a forward vehicle with respect to a time point when a lane change of each of the one or more surrounding other vehicles is initiated or ended.

In an exemplary embodiment of the present disclosure, the controller may be configured to determine whether the one or more surrounding other vehicles are the vehicles suitable for the lateral following autonomous driving control of the vehicle, based on a time taken for each of the one or more surrounding other vehicles to make a lane change.

In an exemplary embodiment of the present disclosure, the controller may be configured to determine whether the one or more surrounding other vehicles are the vehicles suitable for the lateral following autonomous driving control of the vehicle, based on a degree of biased driving performed by each of the one or more surrounding other vehicles, when the one or more surrounding other vehicles are close to a dangerous vehicle.

In an exemplary embodiment of the present disclosure, the controller may be configured to determine whether the one or more surrounding other vehicles are the vehicles suitable for the lateral following autonomous driving control of the vehicle, based on a time point when biased driving of each of the one or more surrounding other vehicles is performed, when the one or more surrounding other vehicles are close to a surrounding dangerous vehicle.

In an exemplary embodiment of the present disclosure, the one or more surrounding other vehicles may include a preceding vehicle traveling on a lane on which the vehicle is traveling. The controller may follow the preceding vehicle to perform the lateral following autonomous driving control of the vehicle, when the controller concludes that the preceding vehicle is the vehicle suitable for the lateral following autonomous driving control.

In an exemplary embodiment of the present disclosure, the one or more surrounding other vehicles may include a preceding vehicle traveling on a lane adjacent to a lane on which the vehicle is traveling. The controller may make a lane change of the vehicle to the adjacent lane by autonomous driving, when the controller concludes that the preceding vehicle is the vehicle suitable for the lateral following autonomous driving control and may follow the preceding vehicle to perform the lateral following autonomous driving control of the vehicle.

In an exemplary embodiment of the present disclosure, the one or more surrounding other vehicles may include a preceding vehicle traveling on a lane expected to make an additional lane change while driving. The controller may make a lane change of the vehicle to the lane expected to make the additional lane change while driving by autonomous driving, when the controller concludes that the preceding vehicle is the vehicle suitable for the lateral following autonomous driving control, may make a lane change to a lane adjacent to the lane expected to make the additional lane change while driving, when the vehicle suitable for the lateral following autonomous driving control is explored among other vehicles which are traveling on the lane adjacent to the lane expected to make the additional lane change while driving before a time point when the additional lane change is required, and may follow the explored other vehicle to perform the lateral following autonomous driving control of the vehicle.

In an exemplary embodiment of the present disclosure, the controller may follow the preceding vehicle to perform the lateral following autonomous driving control of the vehicle, when the vehicle suitable for the lateral following autonomous driving control is not explored among the other vehicles which are traveling on the lane adjacent to the lane expected to make the additional lane change while driving before the time point when the additional lane change is required.

According to another aspect of the present disclosure, an autonomous driving control method may include sensing, by a sensor device provided in a vehicle, pieces of information related to one or more surrounding other vehicles and analyzing, by a controller, lateral behaviors of one or more surrounding other vehicles and determining, by the controller, whether the one or more surrounding other vehicles are vehicles suitable for lateral following autonomous driving control of the vehicle.

In an exemplary embodiment of the present disclosure, the determining of whether the one or more surrounding other vehicles are the vehicles suitable for the lateral following autonomous driving control of the vehicle by the controller may include determining, by the controller, whether the one or more surrounding other vehicles are the vehicles suitable for the lateral following autonomous driving control of the vehicle, based on a similarity between a lateral behavior of the vehicle according to an autonomous driving control strategy of the vehicle and the lateral behaviors of the one or more surrounding other vehicles.

In an exemplary embodiment of the present disclosure, the determining of whether the one or more surrounding other vehicles are the vehicles suitable for the lateral following autonomous driving control of the vehicle by the controller may include determining, by the controller, whether the one or more surrounding other vehicles are the vehicles suitable for the lateral following autonomous driving control of the vehicle, based on lane following performance of each of the one or more surrounding other vehicles.

In an exemplary embodiment of the present disclosure, the determining of whether the one or more surrounding other vehicles are the vehicles suitable for the lateral following autonomous driving control of the vehicle by the controller may include determining, by the controller, whether the one or more surrounding other vehicles are the vehicles suitable for the lateral following autonomous driving control of the vehicle, based on a distance from a forward vehicle with respect to a time point when a lane change of each of the one or more surrounding other vehicles is initiated or ended.

In an exemplary embodiment of the present disclosure, the determining of whether the one or more surrounding other vehicles are the vehicles suitable for the lateral following autonomous driving control of the vehicle by the controller may include determining, by the controller, whether the one or more surrounding other vehicles are the vehicles suitable for the lateral following autonomous driving control of the vehicle, based on a time taken for each of the one or more surrounding other vehicles to make a lane change.

In an exemplary embodiment of the present disclosure, the determining of whether the one or more surrounding other vehicles are the vehicles suitable for the lateral following autonomous driving control of the vehicle by the controller may include determining, by the controller, whether the one or more surrounding other vehicles are the vehicles suitable for the lateral following autonomous driving control of the vehicle, based on a degree of biased driving performed by each of the one or more surrounding other vehicles, when the one or more surrounding other vehicles are close to a dangerous vehicle.

In an exemplary embodiment of the present disclosure, the determining of whether the one or more surrounding other vehicles are the vehicles suitable for the lateral following autonomous driving control of the vehicle by the controller may include determining, by the controller, whether the one or more surrounding other vehicles are the vehicles suitable for the lateral following autonomous driving control of the vehicle, based on a time point when biased driving of each of the one or more surrounding other vehicles is performed, when the one or more surrounding other vehicles are close to a surrounding dangerous vehicle.

In an exemplary embodiment of the present disclosure, the autonomous driving control method may further include making, by the controller, a lane change to a lane adjacent to a lane on which the vehicle is traveling by autonomous driving, when the controller concludes that a preceding vehicle traveling on the lane adjacent to the lane on which the vehicle is traveling among the one or more surrounding other vehicles is the vehicle suitable for the lateral following autonomous driving control, and following, by the controller, the preceding vehicle to perform the lateral following autonomous driving control of the vehicle.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

BRIEF DESCRIPTION OF THE DRAWINGS

FIG. 1 is a table where an automation level of an autonomous vehicle is defined;

Figure 2:
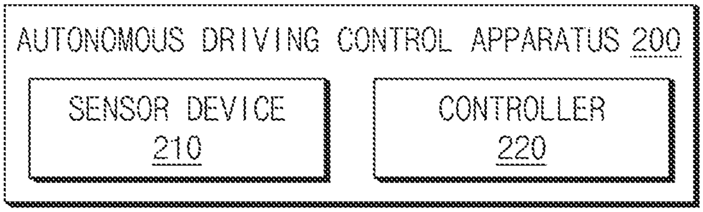
FIG. 2 is a block diagram illustrating an autonomous driving control apparatus according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various exemplary embodiments of the present disclosure will be described in detail with reference to the exemplary drawings. In the drawings, the same reference numerals will be used throughout to designate the same or equivalent elements. Furthermore, a detailed description of well-known features or functions will be ruled out in order not to unnecessarily obscure the gist of the present disclosure.

In describing the components of the exemplary embodiment of the present disclosure, terms such as first, second, "A", "B", (a), (b), and the like may be used. These terms are only used to distinguish one element from another element, but do not limit the corresponding elements irrespective of the order or priority of the corresponding elements. Furthermore, unless otherwise defined, all terms including technical and scientific terms used herein are to be interpreted as is customary in the art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, various embodiments of the present disclosure will be described in detail with reference to FIGS. 1 to 7.

FIG. 1 is a table where an automation level of an autonomous vehicle is defined;

An autonomous vehicle refers to a vehicle which recognizes a driving environment by itself to determine risk, controls its driving route to minimize driving manipulation of a driver, and drives itself.

Finally, the autonomous vehicle refers to a vehicle configured for performing driving, steering, and parking without influence of persons and is focused on a vehicle where an autonomous driving technology, which is the core foundation of the autonomous vehicle, that is, a capability of operating the vehicle without active control or monitoring of the driver—is developed to the highest degree.

Referring to FIG. 1, the driving environment is monitored by the driver in automation levels LEVELs 0 to 2. On the other hand, the driving environment is monitored by the automated driving system in automation levels LEVELs 3 to 5.

However, the concept of autonomous vehicles currently on the market may include an intermediate automation level to a fully autonomous vehicle and may correspond to a goal-oriented concept premised on the mass production and commercialization of fully autonomous vehicles.

An autonomous driving control method according to an exemplary embodiment of the present disclosure is applicable to an autonomous vehicle corresponding to LEVEL 3 (partial automation) and LEVEL 5 (conditional automation) in autonomous driving automation levels shown in FIG. 1, but is not necessarily limited thereto, and is applicable to an autonomous vehicle supporting a plurality of various automation levels.

An automation level of the autonomous vehicle may be classified as shown in a table of FIG. 1 based on the society of automotive engineers (SAE).

FIG. 2 is a block diagram illustrating an autonomous driving control apparatus according to an exemplary embodiment of the present disclosure.

An autonomous driving control apparatus 200 according to an exemplary embodiment of the present disclosure may be implemented inside or outside a vehicle. In the instant case, the autonomous driving control apparatus 200 may be integrally configured with control units in the vehicle or may be implemented as a separate hardware device to be connected to the control units of the vehicle by a connection means.

As an exemplary embodiment of the present disclosure, the autonomous driving control apparatus 200 may be integrally configured with the vehicle or may be implemented as a separate configuration independent of the vehicle in a form of being installed/attached to the vehicle. Alternatively, a part of the autonomous driving control apparatus 200 may be integrally configured with the vehicle and the other may be implemented as a separate configuration independent of the vehicle in a form of being installed/attached to the vehicle.

Referring to FIG. 2, the autonomous driving control apparatus 200 may include a sensor device 210 and a controller 220.

The sensor device 210 may be provided in the vehicle to detect pieces of information related to one or more surrounding other vehicles.

The sensor device 210 may obtain pieces of information related to positions and behaviors of the one or more surrounding other vehicles, by one or more sensors provided in the vehicle.

As an exemplary embodiment of the present disclosure, the sensor device 210 may include at least one of a camera, a radio detection and ranging (radar), or a light detection and ranging (LiDAR).

As an exemplary embodiment of the present disclosure, the sensor device 210 may be directly or indirectly connected to the controller 220 through wireless or wired communication to deliver the obtained pieces of information related to the one or more surrounding other vehicles to the controller 220.

As an exemplary embodiment of the present disclosure, the sensor device 210 may store the obtained pieces of information related to the one or more surrounding other vehicles in a memory so that the controller 220 may access the pieces of information related to the one or more surrounding other vehicles if necessary.

The controller 220 may perform the overall control so that respective components may normally perform their own functions. Such a controller 220 may be implemented in a form of hardware, may be implemented in a form of software, or may be implemented in a form of a combination thereof. The controller 220 may be implemented as, but not limited to, a microprocessor. Furthermore, the controller 220 may perform a variety of data processing, calculation, and the like described below.

The controller 220 may include a processor which performs data processing and/or calculation which will be described below. Furthermore, the controller 220 may include a memory which stores data or an algorithm required in a process of performing data processing and/or calculation.

The processor which may be included in the controller 220 may be an electric circuit which executes a command of software. For example, the processor included in the controller 220 may be an electronic control unit (ECU), a micro controller unit (MCU), or another sub-controller.

The memory which may be included in the controller 220 may include at least one type of storage medium, such as a flash memory type memory, a hard disk type memory, a micro type memory, a card type memory (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic RAM (MRAM), a magnetic disk, or an optical disk.

The controller 220 may analyze lateral behaviors of the one or more surrounding other vehicles and may determine whether the one or more surrounding other vehicles are vehicles suitable for lateral following autonomous driving control of the vehicle.

An existing autonomous driving system simply sets a vehicle in front of the host vehicle to a following target vehicle. However, the autonomous driving control apparatus 200 according to an exemplary embodiment of the present disclosure is to first identify whether another vehicle is suitable for being set to a following target vehicle.

Thus, the controller 220 may analyze a lateral behavior of a forward preceding vehicle traveling on the same lane as the host vehicle and may determine whether the forward preceding vehicle is a vehicle suitable for the lateral following autonomous driving control of the vehicle.

As an exemplary embodiment of the present disclosure, after analyzing the lateral behavior of the forward preceding vehicle, when it is determined that the forward preceding vehicle is the vehicle suitable for the lateral following autonomous driving control of the vehicle, the controller 220 may set the forward preceding vehicle to the following target vehicle. The controller 220 may follow the forward preceding vehicle and may perform the lateral following autonomous driving control of the vehicle.

As an exemplary embodiment of the present disclosure, after analyzing the lateral behavior of the forward preceding vehicle, when it is determined that the forward preceding vehicle is a vehicle unsuitable for the lateral following autonomous driving control of the vehicle, the controller 220 may analyze a lateral behavior of another vehicle which is traveling on another lane and may determine whether the other vehicle which is traveling on the other lane is a vehicle suitable for the lateral following autonomous driving control of the vehicle.

As an exemplary embodiment of the present disclosure, when it is determined that the forward preceding vehicle traveling on the same lane as the host vehicle is the vehicle unsuitable for the lateral following autonomous driving control of the vehicle, the controller 220 may analyze a lateral behavior of surrounding another vehicle traveling on a lane adjacent to an ego-lane in a next priority and may determine whether the surrounding other vehicle traveling on the lane adjacent to the ego-lane is a vehicle suitable for the lateral following autonomous driving control of the vehicle.

As an exemplary embodiment of the present disclosure, when it is determined that a preceding vehicle traveling on a lane adjacent to a lane on which the vehicle is traveling is the vehicle suitable for the lateral following autonomous driving control, the controller 220 may make a lane change of the vehicle to the adjacent lane by autonomous driving and may follow the preceding vehicle traveling on the adjacent lane to perform the lateral following autonomous driving control of the vehicle.

As an exemplary embodiment of the present disclosure, the controller 220 may control driving, braking, and steering of the vehicle using the autonomous driving system of the vehicle to make a lane change of the vehicle.

As an exemplary embodiment of the present disclosure, when it is determined that the surrounding other vehicle traveling on the lane adjacent to the ego-lane is the vehicle unsuitable for the lateral following autonomous driving control of the vehicle, the controller 220 may analyze a lateral behavior of the surrounding other vehicle traveling on a lane except for the ego-lane and the lane adjacent to the ego-lane and may determine whether the surrounding other vehicle traveling on the lane except for the ego-lane and the lane adjacent to the ego-lane is the vehicle suitable for the lateral following autonomous driving control of the vehicle.

As an exemplary embodiment of the present disclosure, there may be surrounding another vehicle traveling a lane expected to make an additional lane change while driving among the one or more surrounding other vehicles.

The lane expected to make the additional lane change while driving may include a lane, such as a passing lane, which is prohibited from driving continuously by regulations and is expected to make the additional lane change.

The lane expected to make the additional lane change while driving may include a lane, such as a reversible lane, which is expected to make the additional lane change as a driving direction or attribute of the lane is changed over time or according to the volume of traffic.

The lane expected to make the additional lane change while driving may include a lane, such as an exit lane of a junction or an interchange, which is connected to another road with respect to the junction or the interchange and is expected to make the additional lane change upon exit and entrance.

Other than the exemplified lanes, the lane expected to make the additional lane change while driving may include another type of lane which is expected to make an additional lane change by regulations or on the route.

As an exemplary embodiment of the present disclosure, when it is determined that the preceding vehicle traveling the lane expected to make the additional lane change while driving is the vehicle suitable for the lateral following autonomous driving control, the controller 220 may make a lane change of the vehicle to the lane expected to make the additional lane change while driving by autonomous driving.

As an exemplary embodiment of the present disclosure, when the vehicle suitable for the lateral following autonomous driving control is explored among other vehicles which are traveling on a lane adjacent to the lane expected to make the additional lane change while driving before a time point when the additional lane change is required, the controller 220 may make a lane change of the vehicle to the adjacent lane and may follow the explored other vehicle to perform the lateral following autonomous driving control of the vehicle.

When the lateral following autonomous driving control is performed by following the other vehicle which is traveling on the lane expected to make the additional lane change, because it is able to reduce stability of autonomous driving, when there is another vehicle which travels on a lane adjacent to the lane expected to make the additional lane change and is suitable for the lateral following autonomous driving control, the controller 220 may make a lane change of the vehicle to the adjacent lane and may follow the other vehicle which travels the adjacent lane and is suitable for the lateral following autonomous driving control to perform the lateral following autonomous driving control of the vehicle.

As an exemplary embodiment of the present disclosure, when the vehicle suitable for the lateral following autonomous driving control is not explored among the other vehicles which are traveling on the lane adjacent to the lane expected to make the additional lane change while driving before the time point when the additional lane change is required, the controller 220 may follow a preceding vehicle traveling on the lane expected to make the additional lane change to perform the lateral following autonomous driving control of the vehicle.

In the present process, the controller 220 may make the additional lane change of the vehicle at the time point when the additional lane change is required.

This is to follow surrounding another vehicle suitable for lateral following autonomous driving control although stability of autonomous driving is reduced as the additional lane change is performed.

Hereinafter, a description will be provided of detailed contents where the controller 220 determines whether the one or more surrounding other vehicles are the vehicles suitable for the lateral following autonomous driving control of the vehicle.

As an exemplary embodiment of the present disclosure, the controller 220 may determine whether the one or more surrounding other vehicles are the vehicles suitable for the lateral following autonomous driving control of the vehicle, based on a similarity between a lateral behavior of the vehicle according to an autonomous driving control strategy of the vehicle and lateral behaviors of the one or more surrounding other vehicles.

When following surrounding another vehicle having a high similarity of a lateral behavior with the lateral behavior of the vehicle according to the autonomous driving control strategy of the vehicle to perform the lateral following autonomous driving control of the vehicle, the controller 220 may prevent an autonomous driving function from being released because of violating the concept of autonomous driving of the vehicle.

Thus, the controller 220 may determine surrounding another vehicle, which has a similarity of a specific level or more of a lateral behavior with the lateral behavior of the vehicle according to the autonomous driving control strategy of the vehicle, as the vehicle suitable for the lateral following autonomous driving control.

In the present process, the controller 220 may digitalize and evaluate the similarity between the lateral behavior of the vehicle according to the autonomous driving control strategy of the vehicle and the lateral behaviors of the one or more surrounding other vehicles. When the digitalized similarity is greater than a predetermined threshold, the controller 220 may determine the surrounding other vehicle as the vehicle suitable for the lateral following autonomous driving control.

As an exemplary embodiment of the present disclosure, the controller 220 may determine whether the one or more surrounding other vehicles are the vehicles suitable for the lateral following autonomous driving control of the vehicle, based on lane following performance of each of the one or more surrounding other vehicles.

When the one or more surrounding other vehicles travel along a line or a lane, lane following performance of each of the one or more surrounding other vehicles may be evaluated according to a degree to which the center portion of each of the one or more surrounding other vehicles is away from the center portion of the lane in a lateral direction.

As an exemplary embodiment of the present disclosure, the controller 220 may fuse positions of the one or more surrounding other vehicles, which are obtained by the sensor device 210, with high definition map information which is previously stored in a memory of the vehicle or is received from a server through a separate communication module and may determine a degree to which the center portion of each of the one or more surrounding other vehicles is away from the center portion of the lane in the lateral direction, thus evaluating lane following performance of each of the one or more surrounding other vehicles.

When lane following performance of the other vehicle has a difference of a specific level or more with lane following performance according to the autonomous driving control strategy of the vehicle, the autonomous driving function may be released or performance of the autonomous driving function may be degraded, in a process of following the other vehicle and performing the lateral autonomous driving control of the vehicle.

Thus, the controller 220 may determine one or more surrounding other vehicles, in which a degree to which the center portion is away from the center portion of the lane in the lateral direction is not greater than a predetermined threshold, as the vehicles suitable for the lateral following autonomous driving control.

As an exemplary embodiment of the present disclosure, the controller 220 may determine whether the one or more surrounding other vehicles are the vehicles suitable for the lateral following autonomous driving control of the vehicle, based on a distance from a forward vehicle with respect to a time point when a lane change of each of the one or more surrounding other vehicles is initiated or ended.

When the distance from the forward vehicle with respect to the time point when the lane change of the other vehicle is initiated or ended has a difference of a specific level or more with a distance of the forward vehicle with respect to a time point when the lane change of the vehicle is initiated or ended according to the autonomous driving control strategy of the vehicle, the autonomous driving control may be released or performance of the autonomous driving function may be degraded, in a process of following the other vehicle and performing lateral autonomous driving control of the vehicle.

Thus, the controller 220 may determine one or more surrounding other vehicles, in which a difference with a distance from the forward vehicle with respect to the time point when the lane change according to the autonomous driving control strategy of the vehicle is initiated or ended has the distance from the forward vehicle with respect to a time point when the lane change is initiated or ended, which is not greater than a predetermined threshold, as the vehicles suitable for the lateral following autonomous driving control.

As an exemplary embodiment of the present disclosure, the controller 220 may determine whether the one or more surrounding other vehicles are the vehicles suitable for the lateral following autonomous driving control of the vehicle, based on a time taken for each of the one or more surrounding other vehicles to make a lane change.

When the time taken for the other vehicle to make the lane change has a difference of a specific level or more with a time taken to make a lane change according to the autonomous driving control strategy of the vehicle, the autonomous driving function may be released or performance of the autonomous driving function may be degraded, in a process of following the other vehicle and performing the lateral autonomous driving control of the vehicle.

Thus, the controller 220 may determine one or more surrounding other vehicles, in which a difference with a time taken to make a lane change according to the autonomous driving control strategy of the vehicle has a time taken to make a lane change, which is not greater than a predetermined threshold, as the vehicles suitable for the lateral following autonomous driving control.

As an exemplary embodiment of the present disclosure, when the one or more surrounding other vehicles are close to a dangerous vehicle, the controller 220 may determine whether the one or more surrounding other vehicles are the vehicles suitable for the lateral following autonomous driving control of the vehicle, based on a degree of biased driving performed by each of the one or more surrounding other vehicles.

As an exemplary embodiment of the present disclosure, the dangerous vehicle may include large vehicles such as a truck and a bus.

According to an exemplary embodiment of the present disclosure, although one or more surrounding other vehicles are not large vehicles such as a truck and a bus, they may be classified into dangerous vehicles according to proximity.

Herein, the degree of the biased driving may include a distance where one or more other vehicles are biased in a lateral direction to an opposite side of the dangerous vehicle.

As an exemplary embodiment of the present disclosure, the controller 220 may use a predetermined reference distance to determine that the one or more surrounding other vehicles are close to a dangerous vehicle.

When the degree of the biased driving of the other vehicle has a difference of a specific level with a degree of biased driving according to the autonomous driving control strategy of the vehicle, the autonomous driving function may be released or performance of the autonomous driving function may be degraded, in a process of following the other vehicle and performing the lateral autonomous driving control of the vehicle.

Thus, the controller 220 may determine one or more surrounding other vehicles, in which a difference with a degree of biased driving according to the autonomous driving control strategy of the vehicle has the degree of the biased driving, which is not greater than a predetermined threshold, as the vehicles suitable for the lateral following autonomous driving control.

As an exemplary embodiment of the present disclosure, when the one or more surrounding other vehicles are close to a surrounding dangerous vehicle, the controller 220 may determine whether the one or more surrounding other vehicles are the vehicles suitable for the lateral following autonomous driving control of the vehicle, based on a time point when biased driving of each of the one or more surrounding other vehicles is performed.

When a time from a time point when the other vehicle is close to the surrounding dangerous vehicle to a time point when the other vehicle performs biased control has a difference of a specific level or more with a time from a time point when the vehicle is close to the surrounding dangerous vehicle according to the autonomous driving control strategy of the vehicle to a time point when the vehicle performs biased control, the autonomous driving function may be released or performance of the autonomous driving function may be degraded, in a process of following the other vehicle and performing the lateral autonomous driving control of the vehicle.

Thus, the controller 220 may determine one or more surrounding other vehicles, in which a difference with the time from the time point when the vehicle is close to the surrounding dangerous vehicle according to the autonomous driving control strategy of the vehicle to the time point when the vehicle performs biased control has the time from the time point when the one or more surrounding other vehicles are close to the surrounding dangerous vehicle to the time point when the one or more surrounding other vehicles perform biased control, which is not greater than a predetermined threshold, as the vehicles suitable for the lateral following autonomous driving control.

As an exemplary embodiment of the present disclosure, the controller 220 may determine one or more surrounding other vehicles, which meet all the conditions exemplified to determine whether the one or more surrounding other vehicles are the vehicles suitable for the lateral following autonomous driving control, as the vehicles suitable for the lateral following autonomous driving control.

As an exemplary embodiment of the present disclosure, the controller 220 may determine one or more surrounding other vehicles, which meet a specific number of conditions among the exemplified conditions, as the vehicles suitable for the lateral following autonomous driving control.

Figure 3:
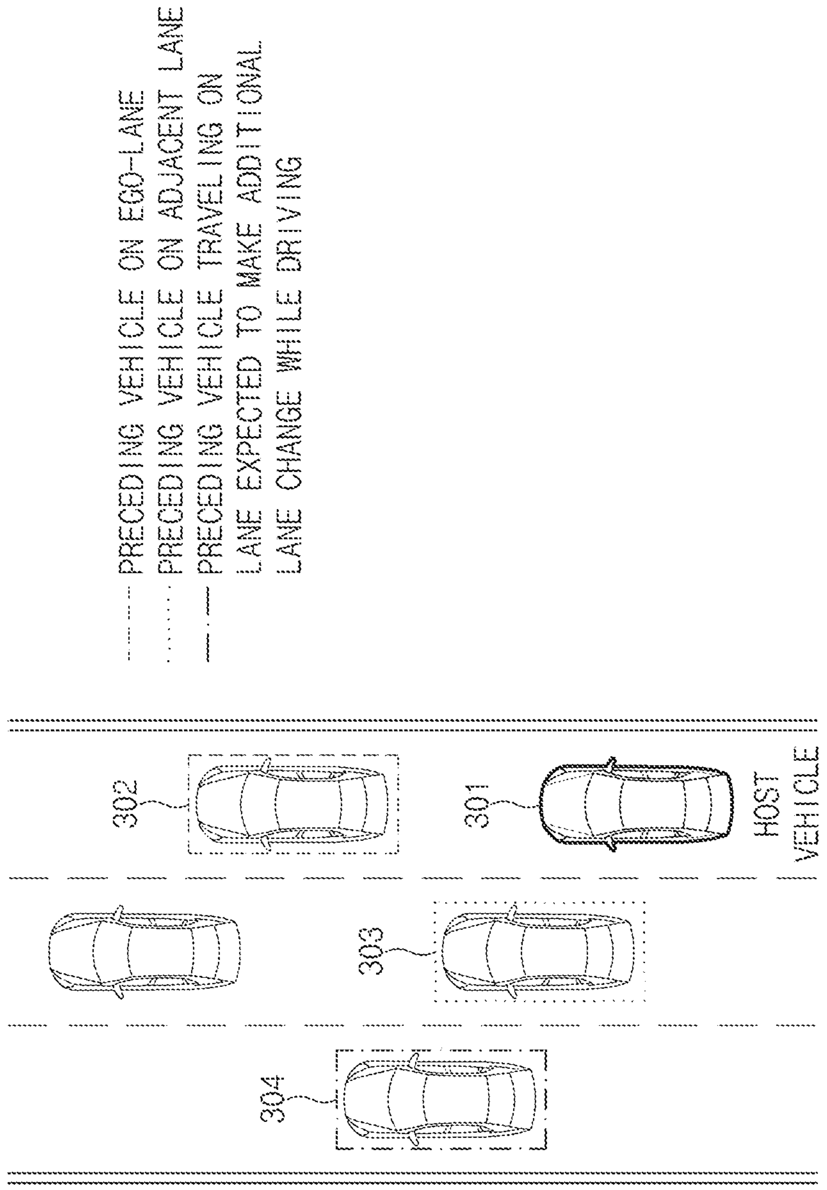
FIG. 3 is a drawing illustrating that an autonomous driving control apparatus classifies surrounding other vehicles according to an exemplary embodiment of the present disclosure.

FIG. 3 is a drawing illustrating that an autonomous driving control apparatus classifies surrounding other vehicles according to an exemplary embodiment of the present disclosure.

Referring to FIG. 3, an autonomous driving control apparatus provided in a host vehicle 301 may obtain pieces of information related to surrounding other vehicles 302, 303, and 304 around the host vehicle 301 by one or more sensors provided in the host vehicle 301.

The autonomous driving control apparatus may obtain pieces of information related to surrounding other vehicles which are traveling on another lane as well as an ego-lane on which the host vehicle 301 is traveling.

The autonomous driving control apparatus may obtain pieces of information related to one or more other vehicles which are traveling in a longitudinal direction ahead of the host vehicle 301.

As an exemplary embodiment of the present disclosure, the autonomous driving control apparatus may first determine whether the preceding vehicle 302 traveling on the ego-lane on which the host vehicle 301 is traveling is a vehicle suitable for lateral following autonomous driving control of the host vehicle 301.

As an exemplary embodiment of the present disclosure, when it is determined that the preceding vehicle 302 traveling on the ego-lane is the vehicle suitable for the lateral following autonomous driving control of the host vehicle 301, the autonomous driving control apparatus may follow the preceding vehicle 302 traveling on the ego-lane to perform the lateral following autonomous driving control of the host vehicle 301.

As an exemplary embodiment of the present disclosure, when it is not determined that the preceding vehicle 302 traveling on the ego-lane is the vehicle suitable for the lateral following autonomous driving control of the host vehicle 301, the autonomous driving control apparatus may determine the preceding vehicle 303 traveling on an adjacent lane is the vehicle suitable for the lateral following autonomous driving control of the host vehicle 301.

As an exemplary embodiment of the present disclosure, when it is determined that the preceding vehicle 303 traveling on the adjacent lane is the vehicle suitable for the lateral following autonomous driving control of the host vehicle 301, the autonomous driving control apparatus may make a lane change to the adjacent lane and may follow the preceding vehicle 303 traveling on the adjacent lane to perform the lateral following autonomous driving control of the host vehicle 301.

As an exemplary embodiment of the present disclosure, when it is not determined that the preceding vehicle 303 traveling on the adjacent lane is the vehicle suitable for the lateral following autonomous driving control of the host vehicle 301, the autonomous driving control apparatus may determine whether a preceding vehicle 304 traveling on a lane expected to make an additional lane change while driving is the vehicle suitable for the lateral following autonomous driving control of the host vehicle 301.

As an exemplary embodiment of the present disclosure, when it is determined that the preceding vehicle 304 traveling on the lane expected to make the additional lane change while driving is the vehicle suitable for the lateral following autonomous driving control of the host vehicle 301, the autonomous driving control apparatus may make a lane change of the host vehicle 301 to the lane expected to make the additional lane change while driving and may follow the preceding vehicle 304 traveling on the lane expected to make the additional lane change while driving to perform the lateral following autonomous driving control of the host vehicle 301.

As an exemplary embodiment of the present disclosure, when the vehicle suitable of the lateral following autonomous driving control of the host vehicle 301 among preceding vehicles traveling on an adjacent lane is explored before an additional lane change time point is reached, the autonomous driving control apparatus may make a lane change of the host vehicle 301 to the adjacent lane and may follow the vehicle suitable for the lateral following autonomous driving control of the host vehicle 301 traveling on the adjacent lane to perform the lateral following autonomous driving control of the host vehicle 301.

As an exemplary embodiment of the present disclosure, when the vehicle suitable of the lateral following autonomous driving control of the host vehicle 301 among the preceding vehicles traveling on the adjacent lane is not explored before the additional lane change time point is reached, the autonomous driving control apparatus may make an additional lane change of the host vehicle 301 and may continue following the other vehicle the host vehicle 301 is following to perform the lateral following autonomous driving control of the host vehicle 301.

Figure 4:
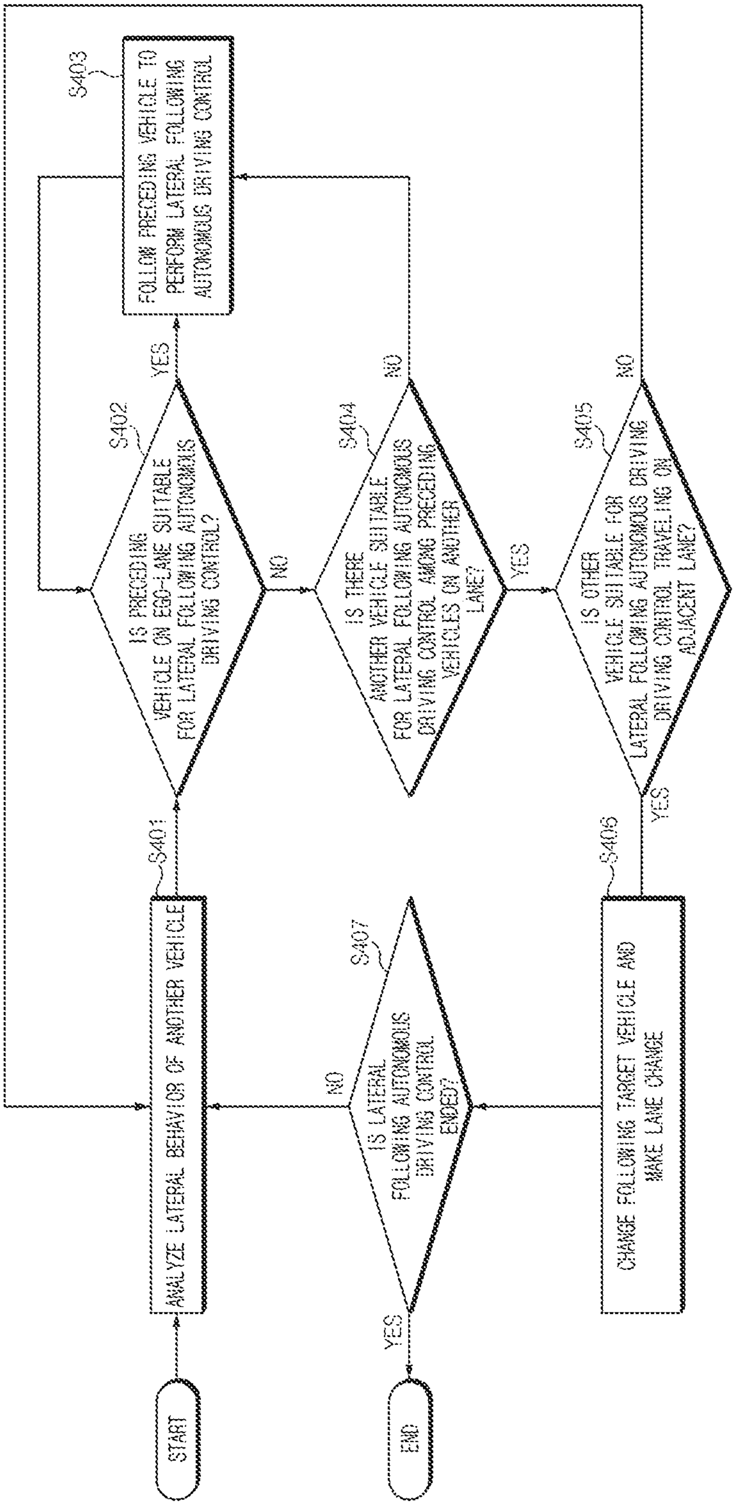
FIG. 4 is a flowchart illustrating an operation of an autonomous driving control apparatus according to an exemplary embodiment of the present disclosure.

FIG. 4 is a flowchart illustrating an operation of an autonomous driving control apparatus according to an exemplary embodiment of the present disclosure.

Hereinafter, it is assumed that an autonomous driving control apparatus 200 of FIG. 2 performs a process of FIG. 4 and FIG. 5. Furthermore, in a description of FIGS. 4 to 5, an operation described as being performed by an autonomous driving control apparatus may be understood as being controlled by a controller 220 of the autonomous driving control apparatus 200.

Referring to FIG. 4, in S401, the autonomous driving control apparatus may analyze a lateral behavior of another vehicle.

As an exemplary embodiment of the present disclosure, when an autonomous driving initiation signal is input from a user by an autonomous driving activation/deactivation button or another user interface (UI) provided in a vehicle, the autonomous driving control apparatus may analyze a lateral behavior of another vehicle based on information obtained by an autonomous driving sensor provided in the vehicle.

As an exemplary embodiment of the present disclosure, the autonomous driving control apparatus may analyze at least one of line following performance of the other vehicle, a distance from a forward vehicle at a time when attempting to make a lane change, a distance from the forward vehicle at a time when the lane change is ended, a time taken to make the lane change, or a biased strategy.

In S402, the autonomous driving control apparatus may determine whether a preceding vehicle on an ego-lane is suitable for lateral following autonomous driving control.

When it is determined that the preceding vehicle on the ego-lane is suitable for the lateral following autonomous driving control, in S403, the autonomous driving control apparatus may follow the preceding vehicle on the ego-lane to perform the lateral following autonomous driving control.

As an exemplary embodiment of the present disclosure, the autonomous driving control apparatus may perform lateral following autonomous driving control for simulating the preceding vehicle on the ego-lane.

The autonomous driving control apparatus may follow the preceding vehicle on the ego-lane to perform the lateral following autonomous driving control and may return to S402 to determine whether the preceding vehicle on the ego-lane is suitable for the lateral following autonomous driving control.

When it is not determined that the preceding vehicle on the ego-lane is suitable for the lateral following autonomous driving control, in S404, the autonomous driving control apparatus may determine whether there is another vehicle suitable for the lateral following autonomous driving control among preceding vehicles on another lane.

When there is no other vehicle suitable for the lateral following autonomous driving control among the preceding vehicles on the other lane, in S403, the autonomous driving control apparatus may follow the preceding vehicle on the ego-lane to perform the lateral following autonomous driving control.

When there is the other vehicle suitable for the lateral following autonomous driving control among the preceding vehicles on the other lane, in S405, the autonomous driving control apparatus may determine whether the other vehicle suitable for the lateral following autonomous driving control is traveling on a lane adjacent to the ego-lane.

As an exemplary embodiment of the present disclosure, the autonomous driving control apparatus may fuse high definition map information, which is previously stored in a memory of the vehicle or is received from a server through a separate communication module with autonomous driving sensor information to determine whether the other vehicle is traveling on the lane adjacent to the ego-lane.

When the other vehicle suitable for the lateral following autonomous driving control is not traveling on the lane adjacent to the ego-lane, the autonomous driving control apparatus may return to S402 to determine whether the preceding vehicle on the ego-lane is suitable for the lateral following autonomous driving control.

When the other vehicle suitable for the lateral following autonomous driving control is traveling on the lane adjacent to the ego-lane, in S406, the autonomous driving control apparatus may change a following target vehicle to the other vehicle suitable for the lateral following autonomous driving control, which is traveling on the lane adjacent to the ego-lane, and may make a lane change to the lane adjacent to the ego-lane.

As an exemplary embodiment of the present disclosure, the autonomous driving control apparatus may perform lateral following autonomous driving control for simulating the following target vehicle.

In S407, the autonomous driving control apparatus may determine whether the lateral following autonomous driving control is ended.

As an exemplary embodiment of the present disclosure, the autonomous driving control apparatus may identify whether the signal for ending the lateral following autonomous driving control is input from a user through an autonomous driving activation/deactivation button or another UI provided in the vehicle to determine whether the lateral following autonomous driving control is ended.

When the lateral following autonomous driving control is not ended, the autonomous driving control apparatus may return to S401 to analyze a lateral behavior of the other vehicle.

Figure 5:
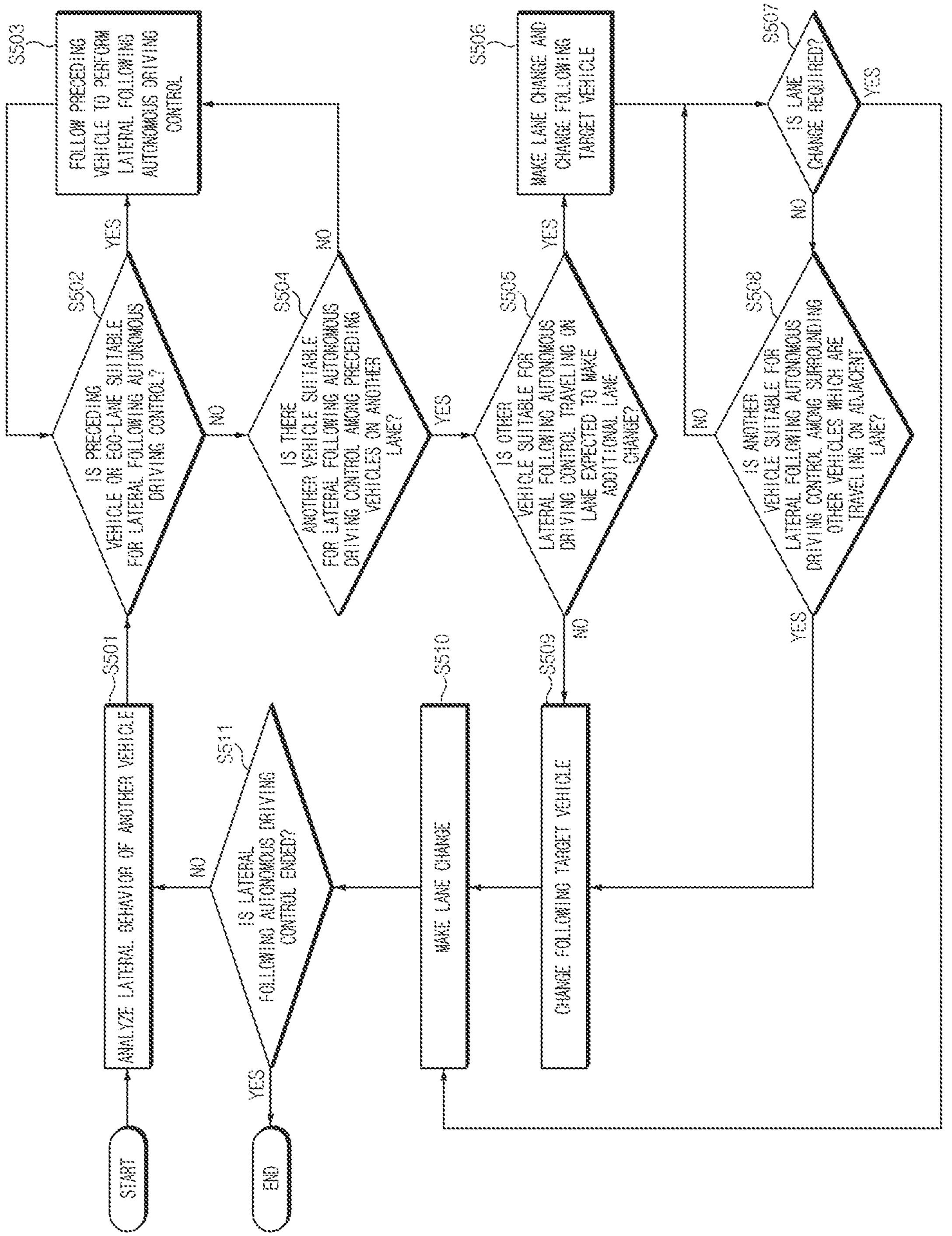
FIG. 5 is a flowchart illustrating an operation of an autonomous driving control apparatus according to another exemplary embodiment of the present disclosure.

FIG. 5 is a flowchart illustrating an operation of an autonomous driving control apparatus according to another exemplary embodiment of the present disclosure.

Referring to FIG. 5, in S501, the autonomous driving control apparatus may analyze a lateral behavior of another vehicle.

In S502, the autonomous driving control apparatus may determine whether a preceding vehicle on an ego-lane is suitable for lateral following autonomous driving control.

When it is determined that the preceding vehicle on the ego-lane is suitable for the lateral following autonomous driving control, in S503, the autonomous driving control apparatus may follow the preceding vehicle on the ego-lane to perform the lateral following autonomous driving control.

The autonomous driving control apparatus may follow the preceding vehicle on the ego-lane to perform the lateral following autonomous driving control and may return to S502 to determine whether the preceding vehicle on the ego-lane is suitable for the lateral following autonomous driving control.

When it is not determined that the preceding vehicle on the ego-lane is suitable for the lateral following autonomous driving control, in S504, the autonomous driving control apparatus may determine whether there is another vehicle suitable for the lateral following autonomous driving control among preceding vehicles on another lane.

When there is no other vehicle suitable for the lateral following autonomous driving control among the preceding vehicles on the other lane, in S503, the autonomous driving control apparatus may follow the preceding vehicle on the ego-lane to perform the lateral following autonomous driving control.

Because the process in S501 to S504 is the same as a process in S401 to S404 of FIG. 4, a detailed description thereof will be omitted.

When there is the other vehicle suitable for the lateral following autonomous driving control among the preceding vehicles on the other lane, in S505, the autonomous driving control apparatus may determine whether the other vehicle suitable for the lateral following autonomous driving control is traveling on a lane expected to make an additional lane change while driving.

As an exemplary embodiment of the present disclosure, the autonomous driving control apparatus may fuse high definition map information, which is previously stored in a memory of the vehicle or is received from a server through a separate communication module, with autonomous driving sensor information to determine whether the other vehicle is traveling on the lane expected to make the additional lane change while driving.

When the other vehicle is traveling on the lane expected to make the additional lane change while driving, in S506, the autonomous driving control apparatus may make a lane change to the lane expected to make the additional lane change while driving and may change a following target vehicle to the other vehicle suitable for the lateral following autonomous driving control.

As an exemplary embodiment of the present disclosure, the autonomous driving control apparatus may perform lateral following autonomous driving control for simulating the following target vehicle.

In S507, the autonomous driving control apparatus may identify whether the additional lane change is required.

In detail, when the vehicle overtakes another vehicle on a passing lane, when a current time is a driving time on a reversible lane, or when the vehicle exits or enters a junction/interchange on a junction/interchange exit lane, the autonomous driving control apparatus may determine that the additional lane change is required.

When the additional lane change is not required, in S508, the autonomous driving control apparatus may identify whether there is another vehicle suitable for lateral following autonomous driving control among surrounding other vehicles which are traveling on an adjacent lane.

When there is the other vehicle suitable for the lateral following autonomous driving control among the surrounding other vehicles which are traveling on the adjacent lane, in S509, the autonomous driving control apparatus may change a following target vehicle to the other vehicle suitable for the lateral following autonomous driving control.

As an exemplary embodiment of the present disclosure, the autonomous driving control apparatus may perform lateral following autonomous driving control for simulating the changed following target vehicle.

When there is no other vehicle suitable for the lateral following autonomous driving control among the surrounding other vehicles which are traveling on the adjacent lane, the autonomous driving control apparatus may return to S507 to identify whether the additional lane change is required.

When the additional lane change is required, in S510, the autonomous driving control apparatus may make a required lane change.

When the other vehicle is not traveling on the lane expected to make the additional lane change while driving, in S509, the autonomous driving control apparatus may change the following target vehicle to the other vehicle suitable for the lateral following autonomous driving control.

After changing the following target vehicle to the other vehicle suitable for the lateral following autonomous driving control in S509, in S510, the autonomous driving control apparatus may make a lane change to the lane on which the other vehicle suitable for the lateral following autonomous driving control is traveling.

In S511, the autonomous driving control apparatus may determine whether the lateral following autonomous driving control is ended.

When the lateral following autonomous driving control is not ended, the autonomous driving control apparatus may return to S501 to analyze a lateral behavior of the other vehicle.

Figure 6:
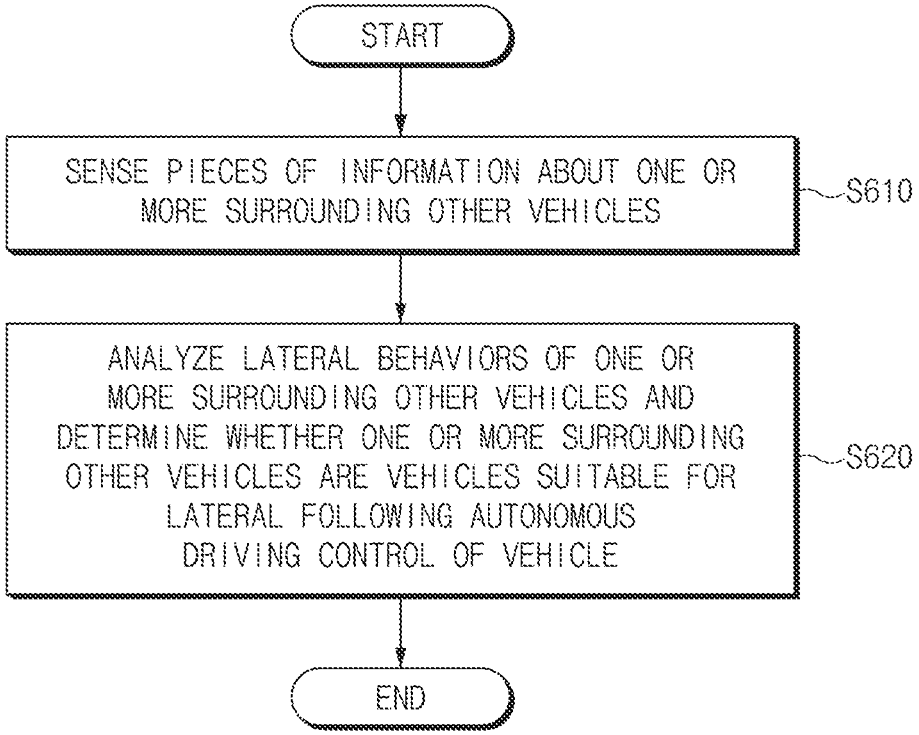
FIG. 6 is a flowchart illustrating an autonomous driving control method according to an exemplary embodiment of the present disclosure.

FIG. 6 is a flowchart illustrating an autonomous driving control method according to an exemplary embodiment of the present disclosure.

Referring to FIG. 6, the autonomous driving control method may include sensing (S610) pieces of information related to one or more surrounding other vehicles and analyzing (S620) lateral behaviors of the one or more surrounding other vehicles and determining whether the one or more surrounding other vehicles are vehicles suitable for lateral following autonomous driving control of a vehicle.

The sensing (S610) of the pieces of information related to the one or more surrounding other vehicles may be performed by a sensor device provided in the vehicle.

The analyzing (S620) of the lateral behaviors of the one or more surrounding other vehicles and the determining of whether the one or more surrounding other vehicles are the vehicles suitable for the lateral following autonomous driving control of the vehicle may be performed by a controller.

As an exemplary embodiment of the present disclosure, the determining (S620) of whether the one or more surrounding other vehicles are the vehicles suitable for the lateral following autonomous driving control of the vehicle may include determining, by the controller, whether the one or more surrounding other vehicles are the vehicles suitable for the lateral following autonomous driving control of the vehicle, based on a similarity between a lateral behavior of the vehicle according to an autonomous driving control strategy of the vehicle and lateral behaviors of the one or more surrounding other vehicles.

As an exemplary embodiment of the present disclosure, the determining (S620) of whether the one or more surrounding other vehicles are the vehicles suitable for the lateral following autonomous driving control of the vehicle may include determining, by the controller, whether the one or more surrounding other vehicles are the vehicles suitable for the lateral following autonomous driving control of the vehicle, based on lane following performance of each of the one or more surrounding other vehicles.

As an exemplary embodiment of the present disclosure, the determining (S620) of whether the one or more surrounding other vehicles are the vehicles suitable for the lateral following autonomous driving control of the vehicle may include determining, by the controller, whether the one or more surrounding other vehicles are the vehicles suitable for the lateral following autonomous driving control of the vehicle, based on a distance from a forward vehicle with respect to a time point when a lane change of each of the one or more surrounding other vehicles is initiated or ended.

As an exemplary embodiment of the present disclosure, the determining (S620) of whether the one or more surrounding other vehicles are the vehicles suitable for the lateral following autonomous driving control of the vehicle may include determining, by the controller, whether the one or more surrounding other vehicles are the vehicles suitable for the lateral following autonomous driving control of the vehicle, based on a time taken for each of the one or more surrounding other vehicles to make a lane change.

As an exemplary embodiment of the present disclosure, the determining (S620) of whether the one or more surrounding other vehicles are the vehicles suitable for the lateral following autonomous driving control of the vehicle may include determining, by the controller, whether the one or more surrounding other vehicles are the vehicles suitable for the lateral following autonomous driving control of the vehicle, based on a degree of biased driving performed by each of the one or more surrounding other vehicles, when the one or more surrounding other vehicles are close to a dangerous vehicle.

As an exemplary embodiment of the present disclosure, the determining (S620) of whether the one or more surrounding other vehicles are the vehicles suitable for the lateral following autonomous driving control of the vehicle may include determining, by the controller, whether the one or more surrounding other vehicles are the vehicles suitable for the lateral following autonomous driving control of the vehicle, based on a time point when biased driving of each of the one or more surrounding other vehicles is performed, when the one or more surrounding other vehicles are close to a surrounding dangerous vehicle.

As an exemplary embodiment of the present disclosure, the autonomous driving control method may further include following, by the controller, a preceding vehicle traveling on a lane on which the vehicle is traveling to perform the lateral following autonomous driving control of the vehicle, when it is determined that the preceding vehicle is determined as the vehicle suitable for the lateral following autonomous driving control.

As an exemplary embodiment of the present disclosure, the autonomous driving control method may further include making, by the controller, a lane change of the vehicle to a lane adjacent to a lane on which the vehicle is traveling by autonomous driving, when it is determined that a preceding vehicle traveling on the lane adjacent to the lane on which the vehicle is traveling among the one or more surrounding other vehicles is the vehicle suitable for the lateral following autonomous driving control, and following by the controller, the preceding vehicle to perform the lateral following autonomous driving control of the vehicle.

As an exemplary embodiment of the present disclosure, the autonomous driving control method may further include making, by the controller, a lane change of the vehicle to a lane expected to make an additional lane change while driving by autonomous driving, when it is determined that a preceding vehicle traveling on the lane expected to make the additional lane change while driving is determined as the vehicle suitable for the lateral following autonomous driving control, making, by the controller, a lane change of the vehicle to a lane adjacent to the lane expected to make the additional lane change while driving, when the vehicle suitable for the lateral following autonomous driving control is explored among other vehicles which are traveling on the lane adjacent to the lane expected to make the additional lane change while driving before a time point when the additional lane change is required, and following, by the controller, the explored other vehicle to perform the lateral following autonomous driving control of the vehicle.

As an exemplary embodiment of the present disclosure, the autonomous driving control method may further include following, by the controller, a preceding vehicle to perform the lateral following autonomous driving control of the vehicle, when the vehicle suitable for the lateral following autonomous driving control is not explored among the other vehicles which are traveling on the lane adjacent to the lane expected to make the additional lane change while driving before the time point when the additional lane change is required.

Figure 7:
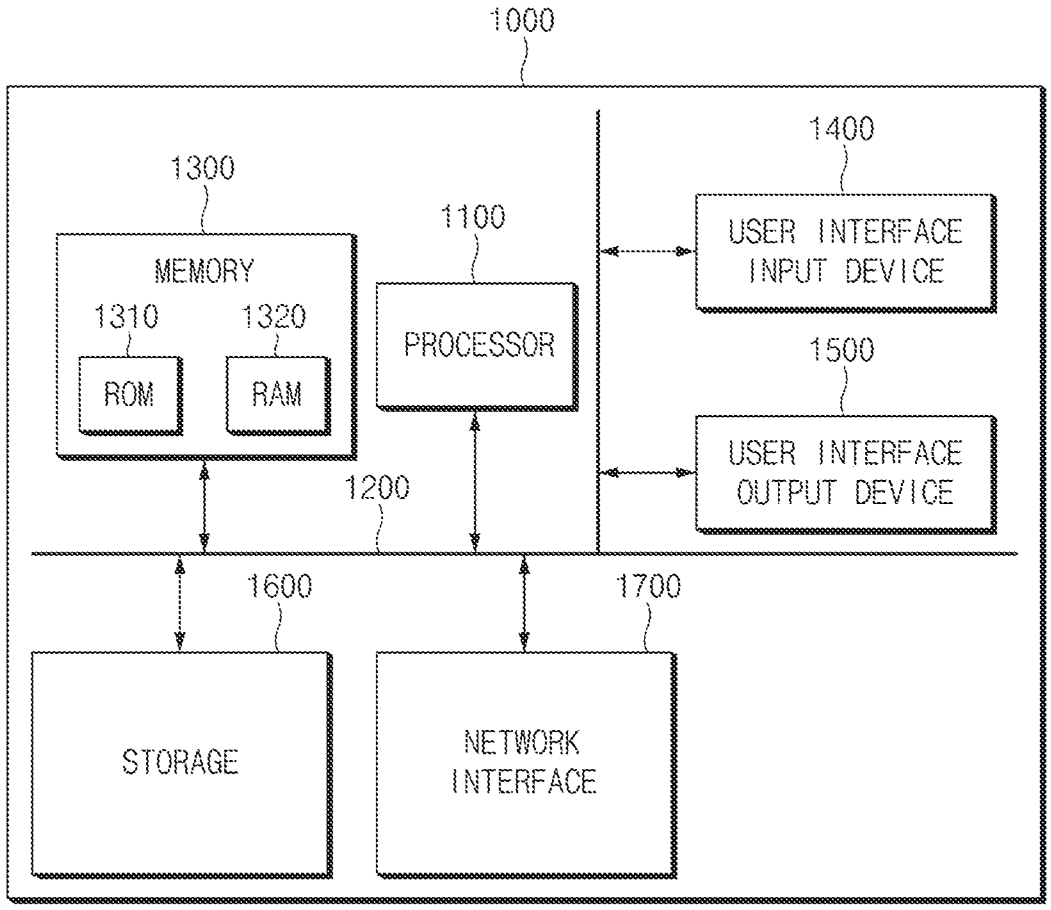
FIG. 7 is a block diagram illustrating a computing system according to an exemplary embodiment of the present disclosure.

FIG. 7 is a block diagram illustrating a computing system according to an exemplary embodiment of the present disclosure.

Referring to FIG. 7, a computing system 1000 may include at least one processor 1100, a memory 1300, a user interface input device 1400, a user interface output device 1500, a storage 1600, and a network interface 1700, which are connected to each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a Read-Only Memory (ROM) 1310 and a Random Access Memory (RAM) 1320.

Thus, the operations of the method or the algorithm described in connection with the exemplary embodiments included herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, and a CD-ROM.

The exemplary storage medium may be coupled to the processor 1100. The processor 1100 may read out information from the storage medium and may write information in the storage medium. Alternatively, the storage medium may be integrated with the processor 1100. The processor and the storage medium may reside in an application specific integrated circuit (ASIC). The ASIC may reside within a user terminal. In another case, the processor and the storage medium may reside in the user terminal as separate components.

A description will be provided of effects of the autonomous driving control apparatus and the method thereof according to an exemplary embodiment of the present disclosure.

According to at least one of embodiments of the present disclosure, the lateral autonomous driving control apparatus the method thereof may be provided to follow a target vehicle.

Furthermore, according to at least one of embodiments of the present disclosure, the autonomous driving control apparatus and the method thereof may be provided to address a problem of an existing technology, in which inappropriate another vehicle is set to a following target for lateral autonomous driving control.

Furthermore, according to at least one of embodiments of the present disclosure, the autonomous driving control apparatus and the method thereof may be provided to actively select a target vehicle optimized for lateral autonomous driving control performance to improve completeness of an autonomous driving function.

Furthermore, according to at least one of embodiments of the present disclosure, the autonomous driving control apparatus and the method thereof may be provided to prevent an autonomous driving function from being released as lateral autonomous driving control following a target vehicle in an autonomous driving system violates the concept of autonomous driving control to improve stability of the autonomous driving system.

Furthermore, according to at least one of embodiments of the present disclosure, the autonomous driving control apparatus and the method thereof may be provided to improve ride quality of an autonomous vehicle.

Furthermore, various effects ascertained directly or indirectly through the present disclosure may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of predetermined exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. An autonomous driving control apparatus, comprising:
a sensor device provided in a host vehicle and configured to detect pieces of information related to one or more surrounding other vehicles around the host vehicle;
a memory storing program instructions; and
a processor configured to:
execute the program instructions, the program instructions when executed configured to:
analyze lateral behaviors of the one or more surrounding other vehicles;
quantize similarity between a lateral behavior of the host vehicle and the lateral behaviors of one or more surrounding vehicles based on a time taken for each of the one or more surrounding other vehicles to make a lane change;
based on determination that the quantized similarity value is greater than a predetermined threshold, determine a surrounding vehicle as a target vehicle; and
control the host vehicle to perform a lateral following autonomous driving control by following the target vehicle.

2. The autonomous driving control apparatus of claim 1, wherein the sensor device includes at least one of a camera, a radio detecting and ranging (radar), or a light detection and ranging (LiDAR).

3. The autonomous driving control apparatus of claim 1, wherein the processor is configured to control the host vehicle to follow the target vehicle based on determination that the target vehicle is traveling in a lane in which the host vehicle is traveling.

4. The autonomous driving control apparatus of claim 1, wherein the target vehicle is traveling on a third lane expected to require a lane change while driving, and
wherein the processor is configured to:
make a lane change of the host vehicle to the third lane;
determine another target vehicle traveling on a fourth lane adjacent to the third lane before a time point at which the target vehicle is required to perform additional lane change from the third lane;
make a lane change of the host vehicle to the fourth lane before the time point at which the target vehicle is required to perform the additional lane change from the third lane; and
control the host vehicle to follow the another target vehicle to perform the lateral following autonomous driving control of the host vehicle, and
wherein the processor is configured to determine that the target vehicle is required to perform the additional lane change from the third lane when the host vehicle overtakes another vehicle on a passing lane, when a current time is a driving time on a reversible lane, or when the host vehicle exits or enters a junction/interchange on a junction/interchange exit lane.

5. The autonomous driving control apparatus of claim 4, wherein the processor is configured to continue controlling the host vehicle to follow the target vehicle to perform the lateral following autonomous driving control, when another target vehicle is not determined among vehicles traveling on the fourth lane before the time point at which the target vehicle is required to perform the additional lane change from the third lane.

6. An autonomous driving control method, comprising:
sensing, by a sensor device provided in a host vehicle, pieces of information related to one or more surrounding other vehicles; and
analyzing, by a processor, lateral behaviors of one or more surrounding other vehicles;
quantizing, by the processor, similarity between a lateral behavior of the host vehicle and the lateral behaviors of one or more surrounding vehicles based on a time taken for each of the one or more surrounding other vehicles to make a lane change;
based on determination that the quantized similarity value is greater than a predetermined threshold, determining, by the processor, a surrounding vehicle as a target vehicle; and
controlling, by the processor, the host vehicle to perform a lateral following autonomous driving control by following the target vehicle.

* * * * *